(12) United States Patent
Kitayama et al.

(10) Patent No.: US 6,664,341 B2
(45) Date of Patent: Dec. 16, 2003

(54) LIQUID-CRYSTAL POLYESTER RESIN COMPOSITION

(75) Inventors: Masaya Kitayama, Takaraduka (JP); Kiichi Kometani, Ikeda (JP); Naoshi Saito, Takaraduka (JP)

(73) Assignee: Kabushiki Kaisha Ueno Seiyaku Oyo Kenkyusho, Osaka (JP)

( * ) Notice: Subject to any disclaimer, the term of this patent is extended or adjusted under 35 U.S.C. 154(b) by 4 days.

(21) Appl. No.: 10/009,639

(22) PCT Filed: Apr. 16, 2001

(86) PCT No.: PCT/JP01/03241

§ 371 (c)(1), (2), (4) Date: Dec. 14, 2001

(87) PCT Pub. No.: WO01/81469

PCT Pub. Date: Nov. 1, 2001

(65) Prior Publication Data

US 2002/0190239 A1 Dec. 19, 2002

(30) Foreign Application Priority Data

Apr. 20, 2000 (JP) .......................................... 2000-119763

(51) Int. Cl.⁷ ............................. C08L 67/03; C08L 67/04
(52) U.S. Cl. .................. 525/437; 525/425; 525/444; 252/299.01; 252/299.62; 252/299.66; 252/299.67
(58) Field of Search ................................ 525/437, 444, 525/425; 252/299.01, 299.66, 299.67, 299.62

(56) References Cited

U.S. PATENT DOCUMENTS

| | | | | | |
|---|---|---|---|---|---|
| 4,267,289 | A | * | 5/1981 | Froix | 525/444 |
| 4,563,508 | A | | 1/1986 | Cottis | |
| 5,216,092 | A | * | 6/1993 | Huspeni | 525/444 |
| 5,747,175 | A | * | 5/1998 | Dietz | 428/480 |

FOREIGN PATENT DOCUMENTS

| | | |
|---|---|---|
| EP | 0 376 615 | 7/1990 |
| EP | 0 382 486 | 8/1990 |
| JP | 10-219085 | 8/1998 |
| JP | 11-246653 | 9/1999 |
| JP | 11-246654 | 9/1999 |

* cited by examiner

Primary Examiner—Patricia A. Short
(74) Attorney, Agent, or Firm—Sherman & Shalloway

(57) ABSTRACT

A liquid crystal polyester resin composition which suppresses the formation of a blister caused by a heat treatment at a high temperature and has excellent moldability. This composition comprises (A) a liquid crystal polyester comprising at least two aromatic oxycarbonyl recurring units and (B) a liquid crystal polyester comprising at least two aromatic oxycarbonyl recurring units, at least one aromatic dioxy recurring unit and at least one aromatic dicarbonyl recurring unit. The weight ratio of the liquid crystal polyester (A) to the liquid crystal polyester (B) is 90/10 to 30/70.

6 Claims, No Drawings

LIQUID-CRYSTAL POLYESTER RESIN COMPOSITION

FIELD OF THE INVENTION

The present invention relates to a liquid crystal polyester resin composition. More specifically, it relates to a liquid crystal polyester resin composition which comprises specific thermotropic liquid crystal polyester (to be referred to as "liquid crystal polyester" hereinafter) resins in a predetermined ratio, is excellent in metering stability and moldability such as flowability and suppresses the formation of a blister at the time of soldering.

DESCRIPTION OF THE PRIOR ART

Demand for higher performance plastics has been growing in recent years and a large number of polymers having new various properties have been developed. Out of these, an optically anisotropic liquid crystal resin (liquid crystal polyester) characterized by parallel arrangement of molecular chains is attracting much attention for its excellent flowability and mechanical properties and high temperature under load and continuous use temperature according to molecular structure.

A resin composition obtained by filling a liquid crystal polyester having the above properties with a fibrous reinforcement such as a glass fiber and an inorganic filler such as talc is suitable for use as a material for computer-related electric and electronic parts, machine-related parts and precision machine-related parts, and used to relay cases, switches, coil bobbins, capacitors, connectors, speakers, motor parts such as commitators and separator, and encapsulation for coils, quartz oscillators and elements such as IC chips.

In information and communication fields such as personal computers and portable telephones, parts have been becoming more highly integrated, smaller in size and thickness, and lower in height, there have been many cases where an extremely thin portion having a thickness of 0.5 mm or less is formed, and flowability high enough to fill a resin in such a thin portion completely has been desired. Generally speaking, a liquid crystal polyester is superior to other resins in flowability but further improvement of flowability is necessary when the thickness must be made small.

Although the liquid crystal polyester has low viscosity and excellent flowability, it has a problem with metering stability at the time of molding as its conflicting function. Particularly when its molded article is large in size or the amount of a resin to be molded (metering value) is increased to produce a large number of molded articles at one time, molding problems often occur that a short shot and overpacking are repeated alternately due to metering instability and that a mold is not filled with a resin completely due to a back flow (back flow of a resin). These molding problems must be solved to form a part having a thin portion as described above.

When a molded article is left in the high-temperature air or liquid for a long time, or soldered, a swelling called "blister" may be formed on the surface. The cause of this phenomenon is unknown but it is assumed that a decomposition gas generated when the liquid crystal polyester is in a molten state or air contained during molding is introduced into the inside of the molded article and expanded by the subsequent heat treatment at a high temperature, thereby forcing up the surface of the molded article softened by heating and forming a blister.

In order to prevent the formation of such a blister, it is conceivable that air should be removed completely from a vent hole during the melt extrusion of the material, the material should not be retained in a molding machine for a long time at the time of molding, or back pressure is applied. Operation condition ranges for these are narrow and not satisfactory to obtain a molded article free from a blister.

JP-A 11-246653 and JP-A 11-246654 (the term "JP-A" as used herein means an "unexamined published Japanese patent application") disclose that the formation of a blister in a liquid crystal polyester is prevented by acylating an aromatic compound having a phenolic hydroxyl group with a specific amount of a fatty acid anhydride and carrying out an ester exchange reaction between the acylated aromatic compound and an aromatic carboxylic acid. However, as its prevention effect is not satisfactory and balance between flowability and metering stability at the time of molding is not improved, it is difficult to obtain both blister prevention effect and moldability at the same time.

It has been known that two different liquid crystal polyesters are blended together and JP-A 10-219085 discloses that a liquid crystal polyester resin comprising two different liquid crystal polyesters having specific flow temperatures is excellent in flowability in a thin portion and heat resistance. However, the resin is unsatisfactory in terms of metering stability and blister suppression effect at the time of soldering and it is therefore still difficult to obtain both blister prevention effect and moldability at the same time.

Thus, a liquid crystal polyester resin composition which has good balance among metering stability, moldability such as flowability and heat resistance is not found yet.

SUMMARY OF THE INVENTION

It is therefore an object of the present invention to provide a liquid crystal polyester resin composition which suppresses the formation of a blister caused by a heat treatment at a high temperature and has excellent moldability.

Other objects and advantages of the present invention will become apparent from the following description.

According to the present invention, the above objects and advantages of the present invention are attained by a liquid crystal polyester resin composition which comprises (A) a liquid crystal polyester comprising at least two aromatic oxycarbonyl recurring units and (B) a liquid crystal polyester comprising at least two aromatic oxycarbonyl recurring units, at least one aromatic dioxy recurring unit and at least one aromatic dicarbonyl recurring unit in a (A)/(B) weight ratio of 90/10 to 30/70.

DETAILED DESCRIPTION OF THE PREFERRED EMBODIMENT

The liquid crystal polyesters (A) and (B) used in the present invention have aromatic oxycarbonyl recurring units as described above. The recurring units are preferably represented by the following formula (I):

(I)

wherein $Ar^1$ is a benzene ring or naphthalene ring which may be substituted by an alkyl group, alkoxy group, aryl group or halogen atom.

Monomers which can be used to introduce the above recurring units include 4-hydroxybenzoic acid, 3-hydroxybenzoic acid, 2-hydroxybenzoic acid, 2-hydroxy-6-naphthoic acid, 2-hydroxy-5-naphthoic acid, 3-hydroxy-2-naphthoic acid, 2-hydroxy-3-naphthoic acid, 4'-hydroxyphenyl-4-benzoic acid, 3'-hydroxyphenyl-4-benzoic acid, 4'-hydroxyphenyl-3-benzoic acid, alkyl, alkoxy, aryl and halogen substituted products thereof, and functional derivatives thereof. To produce the liquid crystal polyesters (A) and (B), at least two of the above monomers must be used. For example, three or more of the above monomers may be used.

The liquid crystal polyester (A) preferably consists of the following monomer structural units: 4-hydroxybenzoic acid/2-hydroxy-6-naphthoic acid, 4-hydroxybenzoic acid/2-hydroxy-6-naphthoic acid/2-hydroxy-3-naphthoic acid, 4-hydroxybenzoic acid/3-hydroxybenzoic acid/2-hydroxy-6-naphthoic acid, 4-hydroxybenzoic acid/4'-hydroxypheny-4-benzoic acid, and 2-hydroxy-6-naphthoic acid/4'-hydroxyphenyl-4-benzoic acid.

Particularly preferred monomers used in the liquid crystal polyester (A) are 4-hydroxybenzoic acid and 2-hydroxy-6-naphthoic acid. When these two monomers are used, recurring units introduced by these are represented by the following formulas (I)-1 and (I)-2.

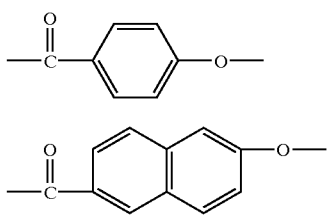

The molar ratio of the recurring unit represented by the formula (I)-1 to the recurring unit represented by the formula (I)-2 is preferably in the range of 90/10 to 50/50, more preferably 85/15 to 60/40.

By causing a small amount of another component such as an aromatic aminocarboxylic acid, aromatic monoalcohol, aromatic monocarboxylic acid, aromatic dicarboxylic acid, aromatic amino-alcohol, aromatic monoamine, aromatic diamine and ester thereof and/or amide forming derivative to be existent during the polymerization of the liquid crystal polyester (A), a liquid crystal polyester and liquid crystal polyester amide having one of the residual groups of the above components at the terminal of a molecular chain may be used.

The content of the another component such as an aromatic aminocarboxylic acid is preferably 5 mol % or less based on the total of the wholly aromatic oxycarbonyl recurring units constituting the liquid crystal polyester (A).

The liquid crystal polyester (B) used in the present invention has an aromatic dioxy recurring unit as described above. The recurring unit is preferably represented by the following formula (II):

—O—Ar$^2$—O—   (II)

wherein Ar$^2$ is a benzene ring, naphthalene ring, biphenyl ring, biphenylether ring or biphenylalkane ring (alkane has 1 to 4 carbon atoms) which may be substituted by an alkyl group, alkoxy group or halogen atom.

Ar$^2$ is preferably one of the following groups:

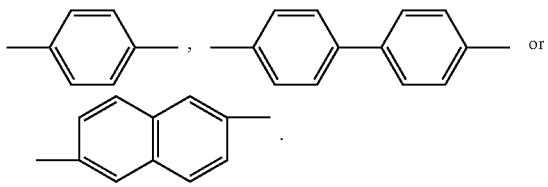

Monomers which can be used to introduce the recurring unit are an aromatic diol selected from aromatic diols such as hydroquinone, resorcin, 2,6-dihydroxynaphthalene, 2,7-dihydroxynaphthalene, 1,6-dihydroxynaphthalene, 4,4'-dihydroxybiphenyl, 3,3'-dihydroxybiphenyl 3,4'-dihydroxybiphenyl, 4,4'-dihydroxybiphenyl ether and bis(4-hydroxyphenyl)ethane, and alkyl, alkoxy and halogen substituted products thereof, and an ester forming derivative thereof. Out of these, hydroquinone, 4,4'-dihydroxybiphenyl and 2,6-dihydroxynaphthalene are preferred.

The liquid crystal polyester (B) used in the present invention further has an aromatic dicarbonyl recurring unit. The recurring unit is preferably represented by the following formula (III):

wherein Ar$^3$ is a benzene ring, naphthalene ring, biphenyl ring, biphenylether ring or biphenylalkane ring (alkane has 1 to 4 carbon atoms) which may be substituted by an alkyl group, alkoxy group or halogen atom.

Ar$^3$ is preferably represented by one of the following groups:

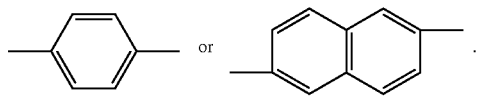

Monomers which can be used to introduce the above recurring unit are an aromatic dicarboxylic acid selected from aromatic dicarboxylic acids such as terephthalic acid, isophthalic acid, 2,6-naphthalenedicarboxylic acid, 1,6-naphthalenedicarboxylic acid, 2,7-naphthalenedicarboxylic acid, 4,4'-dicarboxybiphenyl. bis(4-carboxyphenyl)ether, bis(4-carboxyphenoxy)butane, bis(4-carboxyphenyl)ethane, bis(3-carboxyphenyl)ether and bis(3-carboxyphenyl)ethane, and alkyl, alkoxy and halogen substituted products thereof, and an ester forming derivative thereof. Out of these, terephthalic and 2,6-naphthalenedicarboxylic acid are preferred.

Another component, for example, an amino group-containing monomer such as an aromatic aminocarboxylic acid, aromatic amino-alcohol or aromatic diamine may be further copolymerized with the liquid crystal polyester (B). The content of the another component is preferably 20 mol % or less, particularly preferably 5 mol % or less based on the total of the aromatic oxycarbonyl recurring units, aromatic dioxy recurring unit and aromatic dicarbonyl recurring unit constituting the liquid crystal polyester (B).

By causing an aromatic monoalcohol, aromatic monocarboxylic acid, aromatic monoamine and an ester and/or amide forming derivative thereof to be existent during the polymerization of the liquid crystal polyester (B), a liquid crystal polyester and liquid crystal polyester amide having one of the residual groups of the above components at the terminal of a molecular chain may also be used.

The content of the above another component such as an aromatic monoalcohol is preferably 5 mol % or less based on the total of the aromatic oxycarbonyl recurring units, aromatic dioxy recurring unit and aromatic dicarbonyl recurring unit constituting the liquid crystal polyester (B).

The liquid crystal polyester (B) preferably comprises the following monomer structural units: 4-hydroxybenzoic acid/2-hydroxy-6-naphthoic acid/terephthalic acid/hydroquinone copolymer, 4-hydroxybenzoic acid/2-hydroxy-6-naphthoic acid/terephthalic acid/isophthalic acid/hydroquinone copolymer, 4-hydroxybenzoic acid/2-hydroxy-6-naphthoic acid/2,6-naphthalenedicarboxylic acid/hydroquinone copolymer, 4-hydroxybenzoic acid/2-hydroxy-6-naphthoic acid/terephthalic acid/2,6-naphthalenedicarboxylic acid/hydroquinone copolymer, 4-hydroxybenzoic acid/2-hydroxy-6-naphthoic acid/terephthalic acid/2,6-naphthalenedicarboxylic acid/4,4'-dihydroxybiphenyl copolymer, 4-hydroxybenzoic acid/2-hydroxy-6-naphthoic acid/2,6-naphthalenedicarboxylic acid/4,4'-dihydroxybiphenyl copolymer, 4-hydroxybenzoic acid/2-hydroxy-6-naphthoic acid/2,6-naphthalenedicarboxylic acid/4,4'-dihydroxybiphenyl/hydroquinone copolymer, 4-hydroxybenzoic acid/2-hydroxy-6-naphthoic acid/terephthalic acid/4,4'-dihydroxybiphenyl copolymer, 4-hydroxybenzoic acid/2-hydroxy-6-naphthoic acid/terephthalic acid/isophthalic acid/4,4'-dihydroxybiphenyl copolymer, 4-hydroxybenzoic acid/2-hydroxy-6-naphthoic acid/terephthalic acid/hydroquinone/4,4'-dihydroxybiphenyl copolymer, 4-hydroxybenzoic acid/2-hydroxy-6-naphthoic acid/terephthalic acid/4,4'-dihydroxybiphenyl/4-aminophenol copolymer, 4-hydroxybenzoic acid/2-hydroxy-6-naphthoic acid/terephthalic acid/hydroquinone/4-aminophenol copolymer and 4-hydroxybenzoic acid/4'-hydroxyphenyl-4-benzoic acid/terephthalic acid/hydroquinone copolymer.

Out of these, 4-hydroxybenzoic acid/2-hydroxy-6-naphthoic acid/terephthalic acid/hydroquinone copolymer, 4-hydroxybenzoic acid/2-hydroxy-6-naphthoic acid/2,6-naphthalenedicarboxylic acid/hydroquinone copolymer and 4-hydroxybenzoic acid/2-hydroxy-6-naphthoic acid/terephthalic acid/4,4'-dihydroxybiphenyl copolymer are preferred.

When the two aromatic oxycarbonyl recurring units of the liquid crystal polyester (B) are recurring units represented by the formulas (I)-1 and (I)-2, the molar ratio of the recurring unit of the formula (I)-1 to the recurring unit of the formula (I)-2 is preferably 90/10 to 10/90, more preferably 80/20 to 20/80. The molar ratio of the aromatic dioxy recurring unit to the aromatic dicarbonyl recurring unit is preferably 55/45 to 45/55, more preferably 52/48 to 48/52. The molar ratio of the total of the aromatic oxycarbonyl recurring units to the total of the aromatic dioxy and aromatic dicarbonyl recurring units is preferably 85/15 to 30/70, more preferably 80/20 to 40/60, particularly preferably 70/30 to 50/50.

The liquid crystal polyester resin composition of the present invention contains the above liquid crystal polyesters (A) and (B) in an (A)/(B) weight ratio of 90/10 to 30/70, preferably 80/20 to 40/60.

When the amount of the liquid crystal polyester (A) is larger than 90 wt %, flowability at the time of molding and blister resistance tend to deteriorate and when the amount is smaller than 30 wt %, metering stability at the time of molding is apt to degrade.

The liquid crystal polyesters used in the present invention have a weight average molecular weight of preferably 30,000 to 500,000, more preferably 50,000 to 400,000, particularly preferably 100,000 to 300,000. When the weight average molecular weight is lower than 30,000, high mechanical strength is apt to be hardly obtained.

The weight average molecular weight in the present invention is a value measured by gel permeation chromatography (GPC). In GPC, it is detected at a measurement temperature of 23° C. with a differential refractometer using a mixed solvent of pentafluorophenol and chloroform. The molecular weight value is obtained in terms of polystyrene.

The methods of producing the liquid crystal polyesters (A) and (B) used in the present invention are not particularly limited and conventionally known methods of polycondensing a polyester which forms an ester bond and consists of a combination of the above constituent components, for example, melt acidolysis and slurry polymerization may be used.

The melt acidolysis is preferred to obtain the liquid crystal polyesters (A) and (B) used in the present invention. In this method, monomers are first heated to form a molten solution of a reaction product and a reaction is further continued to obtain a molten polymer. A vacuum may be applied to facilitate the removal of volatile components (such as acetic acid, water, etc.) by-produced in the final stage of condensation.

The slurry polymerization is to carry out a reaction in the presence of a heat exchange fluid so as to obtain a solid product suspended in a heat exchange medium.

In both the above melt acidolysis and slurry polymerization, monomer components used for the production of a liquid crystal polyester may be used in a reaction as a modified form obtained by esterifying a hydroxyl group. that is, a lower acyl ester at normal temperature. The lower acyl group preferably has 2 to 5 carbon atoms, more preferably 2 or 3 carbon atoms. Particularly preferably, acetic acid esters of the above monomer components are used in the reaction.

The lower acyl ester monomers may be synthesized by acylation or may be formed in a reaction system by adding an acylating agent such as acetic anhydride to the monomers at the time of producing a liquid crystal polyester.

In both the above melt acidolysis and slurry polymerization, a catalyst may be optionally used during a reaction.

Examples of the catalyst include organic tin compounds such as dialkyltin oxides (such as dibutyltin oxide) and diaryltin oxides; titanium dioxide, antimony trioxide, organic titanium compounds such as alkoxytitanium silicate and titanium alkoxide; alkali and alkaline earth metal salts of carboxylic acids such as potassium acetate; and gaseous acid catalysts such as Lewis acid (such as $BF_3$) and hydrogen halide (such as HCl).

The amount of the catalyst is preferably 10 to 1,000 ppm, more preferably 20 to 200 ppm based on the total of the monomers.

The liquid crystal polyesters used in the present invention have a melt viscosity measured with a capillary rheometer at a temperature of (melting point thereof+20)° C. of preferably 1 to 80 Pa·s, more preferably 10 to 60 Pa·s.

The liquid crystal polyester resins of the present invention are a polyester resin which forms an anisotropic molten phase and called "thermotropic liquid crystal polyester resin" by people having ordinary skill in the art.

The anisotropic molten phase can be confirmed by a general polarization inspection method using a cross polarizer, that is, observing a sample mounted on a hot stage in a nitrogen atmosphere.

Since liquid crystal polyesters generally do not have high compatibility with each other, the mechanical properties of the liquid crystal polyesters may deteriorate when they are blended together. However, the liquid crystal polyesters of the present invention rarely experience deterioration in physical properties when they are blended together.

At least one fibrous, lamellar or powdery reinforcement and/or filler may be blended with the liquid crystal polyester resin composition of the present invention in addition to liquid crystal polyester resins as matrices.

Examples of the fibrous filler and reinforcement include glass fiber, silica alumina fiber, alumina fiber, carbon fiber and aramid fiber. Out of these, glass fiber is preferred because of good balance between physical properties and cost.

Examples of the lamellar or powdery filler include talc, mica, graphite, wollastonite, calcium carbonate, dolomite, clay, glass flake, glass bead, barium sulfate and titanium oxide.

The total amount of the fibrous, lamellar and powdery reinforcement and/or filler in the liquid crystal polyester resin composition of the present invention is preferably 0 to 100 parts by weight, more preferably 20 to 70 parts by weight based on 100 parts by weight of the total of the liquid crystal polyester resins (A) and (B). When the amount of the fibrous, lamellar and/or powdery inorganic filler is larger than 100 parts by weight, moldability may deteriorate or the abrasion of the cylinder or mold of a molding machine may increase.

General additives including a mold-release agent such as a higher fatty acid, higher fatty acid ester, high fatty acid amide, higher fatty acid metal salt, polysiloxane or fluororesin; colorant such as a dye or pigment; antioxidant; thermal stabilizer; ultraviolet light absorber; antistatic agent; and surfactant may be added to the liquid crystal polyester resin composition of the present invention alone or in combination of two or more in a range without preventing effects of the present invention.

A substance having an externally lubricating effect such as a higher fatty acid, higher fatty acid ester, higher fatty acid metal salt or fluorocarbon-based surfactant may be adhered to a pellet to be molded.

Other resin components such as thermoplastic resins including polyamides, polyesters, polyphenylene sulfides, polyether ketones, polycarbonates, polyphenylene ethers and modified products thereof, polysulfones, polyether sulfones and polyether imides, and thermosetting resins including phenolic resins, epoxy resins and polyimide resins may be added alone or in combination of two or more.

To obtain the liquid crystal polyester resin composition of the present invention, the method of mixing together the liquid crystal polyesters (A) and (B) is not particularly limited and any conventionally known method may be used. For example, the liquid crystal polyesters (A) and (B) are dry blended together and then melt mixed together, or the liquid crystal polyesters (A) and (B) are dissolved in a solvent and mixed together and the solvent is removed. The liquid crystal polyesters (A) and (B) are melt mixed together using a Banbury mixer, kneader or single-screw or twin-screw extruder at a temperature near the melting point of the liquid crystal polyesters to (melting point+100)° C. to obtain a composition.

The soldering heat resistance of the liquid crystal polyester resin composition of the present invention is preferably 220° C. or more, more preferably 240° C. or more, particularly preferably 250° C. or more.

Conventionally known injection molding, compression molding, extrusion molding or blow molding may be used for the obtained liquid crystal polyester resin composition of the present invention and the obtained molded articles, films and fibers are useful for electric and electronic parts, mechanical parts, auto parts and the like.

EXAMPLES

The following examples are provided for the purpose of further illustrating the present invention but are in no way to be taken as limiting. "Parts" in the following examples means "parts by weight" unless otherwise stated.

The liquid crystal polyester resins (to be abbreviated as "LCP" hereinafter) used in the following examples and evaluation methods are given below.

<LCP>

LCP-1: copolymer of 4-hydroxybenzoic acid/2-hydroxy-6-naphthoic acid (molar ratio of 75/25) having an Mw (weight average molecular weight) of 220,000 and a melt viscosity of 26 Pa·s (measured at 320° C.) obtained by deacetation melt polymerization LCP-2: copolymer of 4-hydroxybenzoic acid/2-hydroxy-6-naphthoic acid/terephthalic acid/hydroquinone (molar ratio of 60/10/15/15) having an Mw of 180,000 and a melt viscosity of 22 Pa·s (measured at 350° C.) obtained by deacetation melt polymerization LCP-3: copolymer of 4-hydroxybenzoic acid/2-hydroxy-6-naphthoic acid/2,6-naphthalenedicarboxylic acid/hydroquinone (molar ratio of 72/4/12/12) having an Mw of 210,000 and a melt viscosity of 24 Pa·s (measured at 350° C.) obtained by deacetation melt polymerization LCP-4: copolymer of 4-hydroxybenzoic acid/2-hydroxy-6-naphthoic acid/terephthalic acid/4,4'-dihydroxybiphenyl (molar ratio of 60/10/15/15) having an Mw of 200,000 and a melt viscosity of 30 Pa·s (measured at 350° C.) obtained by deacetation melt polymerization LCP-5: copolymer of 4-hydroxybenzoic acid/2-hydroxy-6-naphthoic acid/isophthalic acid/hydroquinone (molar ratio of 60/20/10/10) having an Mw of 97,000 and a melt viscosity of 5 Pa·s (measured at 300° C.) obtained by deacetation melt polymerization LCP-6: copolymer of 4-hydroxybenzoic acid/2-hydroxy-6-naphthoic acid/terephthalic acid/isophthalic acid/2,2-bis (4-hydroxyphenyl)propane [bisphenol A] (molar ratio of 30/20/6/19/25) having an Mw of 150,000 and a melt viscosity of 25 Pa·s (measured at 350° C.) obtained by deacetation melt polymerization LCP-7: copolymer of 4-hydroxybenzoic acid/terephthalic acid/4,4'-dihydroxyphenyl (molar ratio of 60/20/20) having an Mw of 170,000 and a melt viscosity of 20 Pa·s (measured at 350° C.) obtained by deacetation melt polymerization LCP-8: copolymer of 4-hydroxybenzoic acid/2-hydroxy-6-naphthoic acid/terephthalic acid/ethylene glycol (molar ratio of 65/5/15/15) having an Mw of 160,000 and a melt viscosity of 15 Pa·s (measured at 350° C.) obtained by deacetation melt polymerization LCP-9: copolymer of 4-hydroxybenzoic acid/terephthalic acid/4,4'-dihydroxybiphenyl/ethylene glycol (molar ratio of 60/20/8/12) having an Mw of 160,000 and a melt viscosity of 18 Pa·s (measured at 350° C.) obtained by deacetation melt polymerization LCP-10: copolymer of 4-hydroxybenzoic acid/terephthalic acid/isophthalic acid/hydroquinone/4,4'-dihydroxybiphenyl (molar ratio of 60/15/5/6/14) having an Mw of 170,000 and a melt viscosity of 20 Pa·s (measured at 350° C.) obtained by deacetation melt polymerization LCP-11: copolymer of 2-hydroxy-6-naphthoic acid/terephthalic acid/p-aminophenol (molar ratio of 60/20/20) having an Mw of 180,000 and a melt viscosity of 34 Pa·s (measured at 350° C.) obtained by deacetation melt polymerization It was confirmed by the polarization inspection method that all of the above resins had liquid crystallinity.

<Evaluation Methods> metering stability: 100-shot continuous molding is carried out using an injection molding machine having a cylinder temperature of 345° C. (PS40E5A of Nissei Jushi Kogyo Co., Ltd.) and metering time is measured to obtain fluctuations in metering time from the obtained values (the smaller the fluctuations the higher the metering stability becomes).

flowability: This is evaluated based on a flow length at a cylinder temperature of 345° C. and an injection pressure of 80 MPa using a bar flow length measuring mold having a thickness of 0.3 mm and a width of 12.7 mm.

blister resistance: This is evaluated based on the formation of a blister after a bar flow test sample having a thickness of 0.5 mm, a width of 12.7 mm and a length of 127 mm is placed in ovens at 230° C. and 240° C. for 10 minutes each. ○: no blister, Δ: formation of a small number of blisters, ×: formation of a large number of blisters Izod impact strength: This is measured in accordance with ASTM D256 using a test sample having a thickness of 3.2 mm, a width of 12.7 mm and a length of 127 mm.

Example 1

50 parts of LCP-1 and 50 parts of LCP-2 as liquid crystal polyesters and 45 parts of a glass fiber (3 mm long chopped strand) were dry blended together in a ratio shown in Table 1 and melt kneaded using a twin-screw extruder (PCM-30 of Ikegai Co., Ltd.) having a cylinder temperature of 350° C. to obtain a pellet of a resin composition. The obtained pellet was dried and molded using an injection molding machine to evaluate its metering stability and flowability and to obtain a predetermined test sample so as to evaluate its blister resistance and Izod impact strength. The obtained results are shown in Table 1.

Examples 2 to 7 and Comparative Examples 1 to 7

Liquid crystal polyesters were blended together in ratios shown in Tables 1 and 2 as in Example 1 and the obtained resin compositions were evaluated.

The results are shown in Table 1 and Table 2.

TABLE 1

| | Ex. 1 | Ex. 2 | Ex. 3 | Ex. 4 | Ex. 5 | Ex. 6 | Ex. 7 |
|---|---|---|---|---|---|---|---|
| composition | | | | | | | |
| LCP-1 (parts) | 50 | 80 | 40 | 50 | 50 | 50 | 50 |
| LCP-2 (parts) | 50 | 20 | 60 | | | | |
| LCP-3 (parts) | | | | 50 | | | |
| LCP-4 (parts) | | | | | 50 | | |
| LCP-5 (parts) | | | | | | 50 | |
| LCP-6 (parts) | | | | | | | 50 |
| LCP-7 (parts) | | | | | | | |

TABLE 1-continued

| | Ex. 1 | Ex. 2 | Ex. 3 | Ex. 4 | Ex. 5 | Ex. 6 | Ex. 7 |
|---|---|---|---|---|---|---|---|
| LCP-8 (parts) | | | | | | | |
| LCP-9 (parts) | | | | | | | |
| LCP-10 (parts) | | | | | | | |
| LCP-11 (parts) | | | | | | | |
| glass fiber (parts) | 45 | 45 | 45 | 45 | 45 | 45 | 45 |
| characteristic properties | | | | | | | |
| fluctuations in metering time (sec) | 0.06 | 0.05 | 0.09 | 0.06 | 0.08 | 0.16 | 0.14 |
| flow length (mm) | 124 | 108 | 136 | 125 | 119 | 111 | 107 |
| blister resistance | | | | | | | |
| 230° C. | ○ | ○ | ○ | ○ | ○ | ○ | ○ |
| 240° C. | ○ | ○ | ○ | ○ | ○ | Δ | Δ |
| Izod impact strength (J/m) | 96 | 102 | 90 | 101 | 93 | 84 | 87 |

Ex.: Example

TABLE 2

| | C. Ex. 1 | C. Ex. 2 | C. Ex. 3 | C. Ex. 4 | C. Ex. 5 | C. Ex. 6 | C. Ex. 7 |
|---|---|---|---|---|---|---|---|
| composition | | | | | | | |
| LCP-1 (parts) | 95 | 20 | 50 | 50 | 50 | 50 | 50 |
| LCP-2 (parts) | 5 | 80 | | | | | |
| LCP-3 (parts) | | | | | | | |
| LCP-4 (parts) | | | | | | | |
| LCP-5 (parts) | | | | | | | |
| LCP-6 (parts) | | | | | | | |
| LCP-7 (parts) | | | 50 | | | | |
| LCP-8 (parts) | | | | 50 | | | |
| LCP-9 (parts) | | | | | 50 | | |
| LCP-10 (parts) | | | | | | 50 | |
| LCP-11 (parts) | | | | | | | 50 |
| glass fiber (parts) | 45 | 45 | 45 | 45 | 45 | 45 | 45 |
| characteristic properties | | | | | | | |
| fluctuations in metering time (sec) | 0.05 | 0.23 | 0.31 | 0.29 | 0.27 | 0.33 | 0.20 |
| flow length (mm) | 81 | 149 | 97 | 98 | 101 | 90 | 59 |
| blister resistance | | | | | | | |
| 230° C. | X | Δ | Δ | Δ | Δ | Δ | X |
| 240° C. | X | X | Δ | X | X | X | X |
| Izod impact strength (J/m) | 113 | 71 | 65 | 69 | 70 | 68 | 57 |

C. Ex.: Comparative Example

It is understood from the comparison of the results of Table 1 and Table 2 that a resin composition comprising specific two different liquid crystal polyesters of the present invention is excellent in metering stability and moldability such as flowability and has high blister resistance at the time of soldering.

The liquid crystal polyester resin composition of the present invention has excellent moldability and blister resistance.

What is claimed is:

1. A liquid crystal polyester resin composition comprising (A) a liquid crystal polyester comprising two aromatic oxycarbonyl recurring units represented by the following formulas (I)-1 and (I)-2:

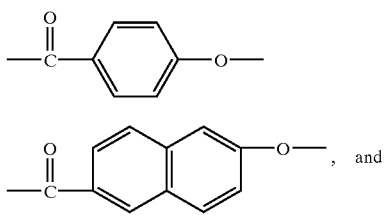 (I)-1

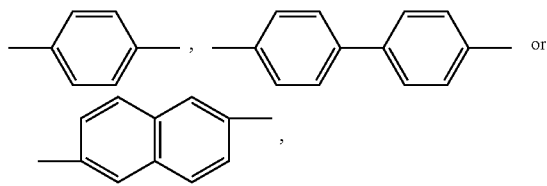 , and (I)-2

(B) a liquid crystal polyester consisting essentially of two aromatic oxycarbonyl units represented by the above formulas (I)-1 and (I)-2, at least one aromatic dioxy recurring unit represented by the following formula (II):

—O—Ar²—O—  (II)

wherein Ar² is

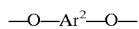

and at least one aromatic dicarbonyl recurring unit represented by the following formula (III):

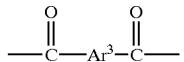 (III)

wherein Ar³ is

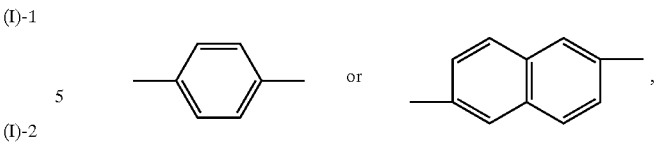

the weight ratio of said liquid crystal polyester (A) to said liquid crystal polyester (B) being 90/10 to 30/70 and said liquid crystal polyester (A) and said liquid crystal polyester (B) having a weight average molecular weight of 30,000 to 500,000.

2. The liquid crystal polyester resin composition of claim 1, wherein the molar ratio of the recurring unit of the formula (I)-1 to the recurring unit of the formula (I)-2 is 90/10 to 50/50.

3. The liquid crystal polyester resin composition of claim 1, wherein the molar ratio of the aromatic dioxy recurring unit to the aromatic dicarbonyl recurring unit in the liquid crystal polyester (B) is 55/45 to 45/55 and the molar ratio of the total of the aromatic oxycarbonyl recurring units to the total of the aromatic dioxy recurring unit and the aromatic dicarbonyl recurring unit is 85/15 to 30/70.

4. The liquid crystal polyester resin composition of claim 1, wherein the weight ratio of the liquid crystal polyester (A) to the liquid crystal polyester (B) is 80/20 to 40/60.

5. The liquid crystal polyester resin composition of claim 1 which further contains at least one fibrous, lamellar or powdery reinforcement and/or filler.

6. The liquid crystal polyester resin composition of claim 1 which has a solder heat resistance temperature of 220° C. or more.

\* \* \* \* \*